May 29, 1928. 1,671,706
W. H. EVANS
REENFORCEMENT FOR FABRIC HOSE
Filed March 21, 1925 2 Sheets-Sheet 1
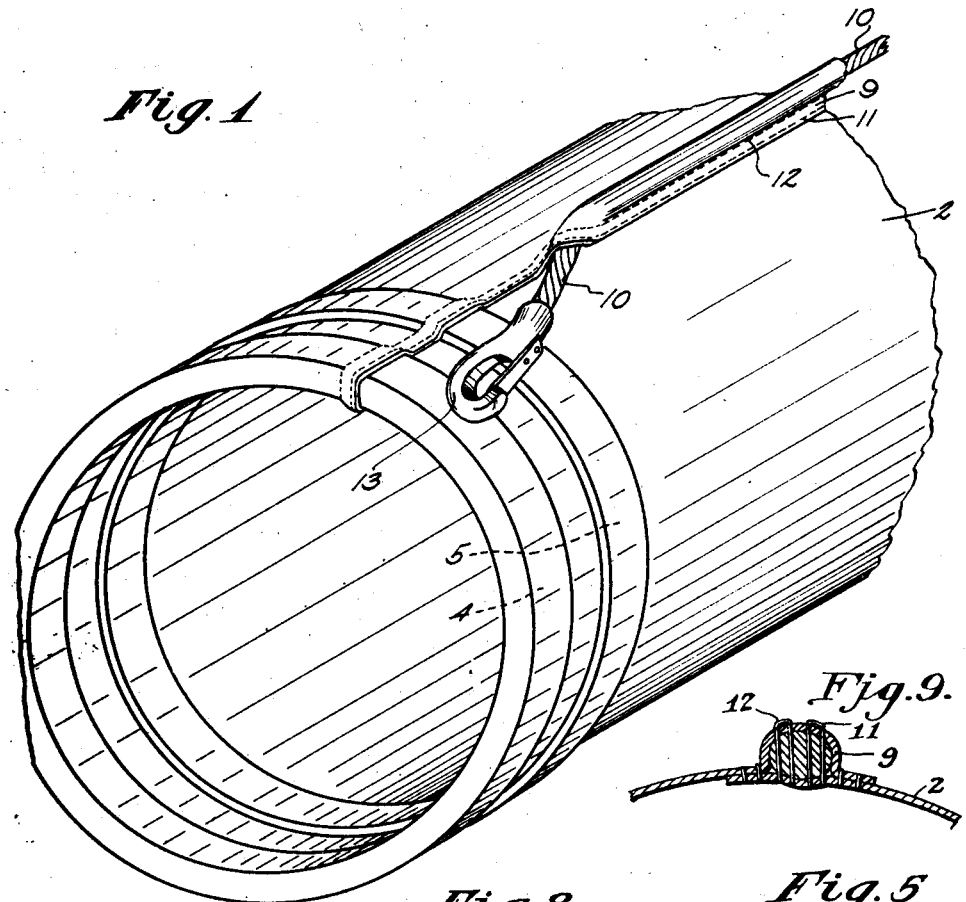
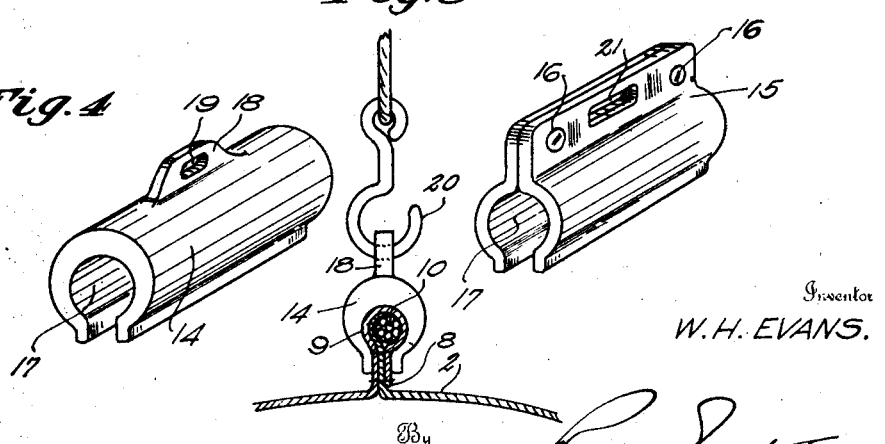
Inventor
W. H. EVANS.

May 29, 1928.  
W. H. EVANS  
1,671,706  
REENFORCEMENT FOR FABRIC HOSE  
Filed March 21, 1925  
2 Sheets-Sheet 2
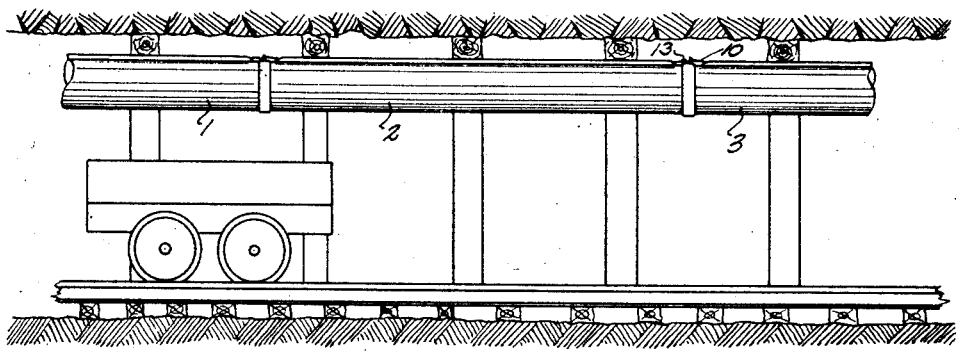
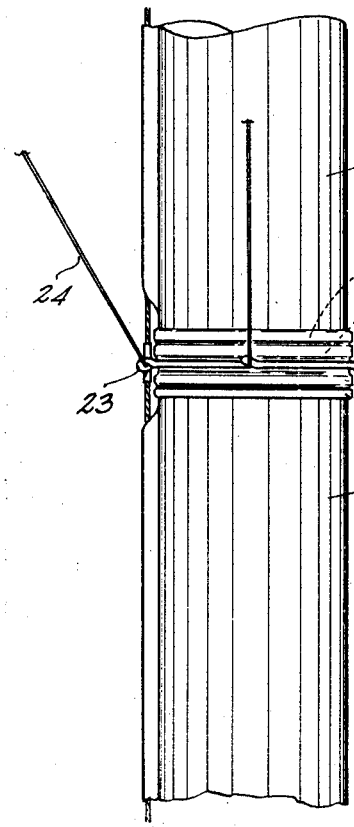
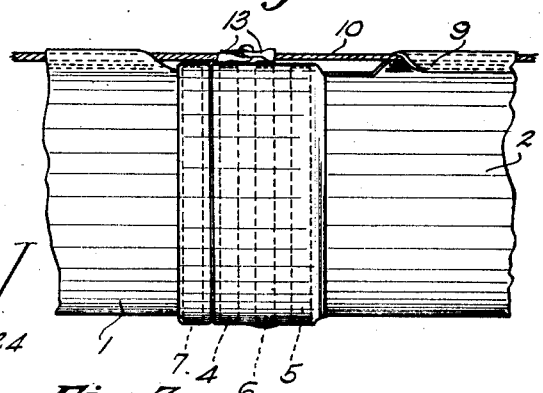
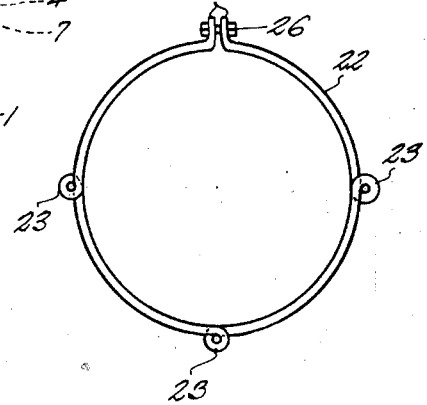
Inventor  
W. H. EVANS.  
By *[signature]* Attorney Patented May 29, 1928.

1,671,706

UNITED STATES PATENT OFFICE.

WILLIAM HOOPER EVANS, OF BIRMINGHAM, ALABAMA.

REENFORCEMENT FOR FABRIC HOSE.

Application filed March 21, 1925. Serial No. 17,448.

My invention relates to a new and improved means for the reenforcement of fabric hose such as is now in general use for delivering air throughout mine workings and for ventilating tunnel work, shafts and the like. This fabric air hose is generally used in all workings where there is no provision of a parallel or return air course.

Heretofore, such hose has been made up in sections provided with various types of quick detachable couplings which enable the sections to be assembled and taken apart to accommodate the hose to the changing use in the mine, shaft and tunnel work.

Long experience with the handling and sale of hose of this type has impressed me with the importance of providing some means, simple and inexpensive in character, which will not only reenforce the hose throughout each length thereof but also across its joints so that the reenforcement will become continuous for the length of the hose and can thus receive the supports for the hose and, if desired, permit the running of a parallel supporting wire above the hose, as is now generally done, to be dispensed with. Such a reenforcement is of special value for sustaining the load of the hose itself when in vertical service.

More particularly, my invention contemplates incorporating in the seam of the hose a flexible reenforcement preferably in the form of a rope, the ends of which pass out of the seam adjacent to the end joint members of the assembled hose and are connected together across the joints, preferably by snap hooks or the like, thus connecting the reenforcements independently of the hose coupling proper and thereby enabling the reenforcements to take most of the strain off of the hose couplings.

My invention further contemplates the utilization, where the hose hangs vertically, of suspension clamp collars applied about the hose couplings and adapted to receive guy wires or supports. By applying these suspension clamp collars and providing proper continuous reenforcement throughout the hose, the latter can be supported in very great lengths without undue strain on the fabric of the hose or its joints.

My invention further contemplates utilizing a clamp collar adapted to interlock between the rings of the hose coupling forming the subject matter of Letters Patent No. 1,525,538, issued to me on February 10th, 1925, my coupling enabling the clamp to be mounted in interleaved position between the end rings of the coupled hose sections.

My invention further comprises the novel details of construction and arrangements of parts, which, in their preferred embodiment only, are illustrated in the accompanying drawings that form a part of this specification and in which:—

Fig. 1 is a detail perspective view of one end of a hose section equipped with my patented joint and with my improved type of reenforcement.

Fig. 2 is a view through a mine or tunnel showing the hose sections coupled and suspended therein.

Fig. 3 is an enlarged detail view in side elevation of a joint showing the reenforcements of adjacent hose sections coupled.

Figs. 4 and 5 are detail views of different types of hanger clamps.

Fig. 6 is a view of my improved reenforced joint with the suspension collar in position.

Fig. 7 is a detail view of the suspension clamp collar.

Fig. 8 is a cross-sectional detail through the seam with a hanger clamp in position thereon.

Fig. 9 is a cross-sectional detail view showing the method of securing the ends of the rope against longitudinal withdrawal from the seam.

Similar reference numerals refer to similar parts throughout the drawings.

In the embodiment of my invention illustrated, I show a fabric hose made up of sections 1, 2 and 3, see Fig. 2, and I provide each of these sections at its ends with a suitable duplicate coupling structure such, for instance, as forms the subject matter of my Letters Patent aforesaid, and which may be briefly described as follows. I stitch in at each end of the hose two rings which at one end are designated 4 and 5, and at the other end 6 and 7, one of each pair being a ring and by deforming the rings at one end and presenting them at an angle to the rings in the end of an adjacent section they can be telescoped and interlocked, as indicated in Fig. 3, with the rings alternating and in this manner the hose sections can be coupled. The hose is made up of a fabric strip having its edges 8 and 9 laid together with 9 made long to fold back down upon 8 after a reenforcing rope or cable 10 has been inserted in the seam, as shown more clearly in Fig. 8. Two rows of stitching 11 and 12 are then employed to secure the seam and to bind the rope in position therein. As the seam approaches each end it is flattened out, as shown in Fig. 1, and the reenforcing rope is brought out under the edge of flap 9, the stitching passing over and through the rope, as seen in Fig. 9, and extending over the hose coupling. The rope can be brought out of the seam without putting any appreciable strain on the seam when the rope is drawn taut. On the end of the reenforcing rope I mount a snap hook 13 which is typical of any available quick detachable coupling for the reenforcing ropes. As the end of the hose section, shown in Fig. 1, is typical of all of the ends of the hose sections, it will be obvious that when the hose sections have been coupled these snap hooks on their reenforcements can also be coupled and that they are so placed that they will, as seen in Fig. 3, relieve the hose couplings of any appreciable strain or duty except that of affording an air tight joint between the hose sections.

In order to suspend the hose sections as thus produced, I can use either an integral cast hanger clamp 14 or a two part clamp 15 formed of stampings adapted to be connected together by screws or bolts 16. Both of the clamps afford a jaw opening 17 which is adapted to receive the cable and upper end of the seam, leaving a bottom opening or neck too small for the cable to pass therethrough. Where the clamp 14 is used it is necessary to slip these onto the seal as the hose is made up and before the snap hooks are applied to the rope ends. The sectional clamp shown in Fig. 5 may be applied at any time. The clamp 14 has a web 18 thereon provided with an eye 19 adapted to receive a suspension hook 20, or any other type of suspension means. The connected flanges of the sections of the clamp 15 are provided with registering openings 21 adapted to receive a suspension means.

Having assembled the hose sections in the manner described and coupled their reenforcing ropes, the hose can be readily suspended from the mine or tunnel timbers, or from pegs inserted in the side walls or be supported by any suspension means anchored in the top wall.

Where it is desired to use the hose in vertical shafts, it is made up as described for the horizontal hose and its reenforcing ropes are coupled as already described. To each hose joint, if desired, I apply my improved suspension clamp collar 22 which, as shown in Fig. 7, is formed of wire bent or otherwise deformed, to provide eyes 23 for the reception of guy wires 24 or equivalent supports. These eyes 24 are spaced equi-distantly about the ring from each other and from out-turned ends 25 of the collar which are adapted to be connected together by a clamp bolt 26 which will receive the fourth guy wire or support. This collar is adapted to interfit between the two solid end rings 4 and 6 which are the innermost rings of each joint, the joint being slightly spread apart to permit this collar to assume position between said rings 4 and 6. This will transfer the load on the underhanging pipe section from its upper end ring 6 direct to this suspension collar and thus will relieve the hose of the strain of supporting its own weight. This clamp collar can be applied at as many joints as operating conditions indicate to be necessary. The reenforcing rope 10 in conjunction with the suspension collars will give the hose all necessary support for use in any desired vertical lengths.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A sectional fabric hose of the character described, having a longitudinal seam, a flexible reenforcement incorporated in said seam and projecting from its ends, and means affording a positive connection between the ends of the flexible reenforcements of adjacent coupled hose sections.

2. A sectional fabric hose of the character described, having couplings to connect the hose sections, flexible longitudinal reenforcements continuous for each section, and independent couplings to connect said reenforcements when the hose is assembled.

3. A reenforced fabric hose in accordance with claim 2, in which the couplings for the reenforcements are set to take the load strain of the hose off the hose couplings.

4. A sectional fabric hose of the character described, comprising hose sections having end couplings and a longitudinal seam which is flattened out adjacent to each end coupling, a reenforcing rope incorporated in said seam and having its ends brought out where the seam is flattened down and coupling members secured to the exposed ends of said rope.

5. A sectional fabric hose in accordance with claim 1, in combination with hangers adapted to receive a supporting element and to clamp the seam and engage about its reenforcement thereby to support the hose.

6. A sectional fabric hose comprising end joint members and a longitudinal seam, a reenforcing rope incorporated in said seam and projecting from the ends thereof, coupling members provided on the ends of the rope, and suspension elements for the hose comprising clamps which are connected to the hose by engaging about the rope in the seam.

7. A sectional fabric hose according to claim 6, in combination with means to secure the ends of the rope against longitudinal withdrawal from the seam.

In testimony whereof I affix my signature.

WILLIAM HOOPER EVANS.